United States Patent
Hoellwarth

(10) Patent No.: US 10,289,199 B2
(45) Date of Patent: May 14, 2019

(54) HAPTIC FEEDBACK SYSTEM

(75) Inventor: Quin C. Hoellwarth, Kuna, ID (US)

(73) Assignee: Apple Inc., Cupertino, CA (US)

( * ) Notice: Subject to any disclaimer, the term of this patent is extended or adjusted under 35 U.S.C. 154(b) by 555 days.

(21) Appl. No.: 12/240,947

(22) Filed: Sep. 29, 2008

(65) Prior Publication Data

US 2010/0079264 A1  Apr. 1, 2010

(51) Int. Cl.
  *G09G 5/00*  (2006.01)
  *G06F 3/01*  (2006.01)
  *G06F 3/041*  (2006.01)

(52) U.S. Cl.
  CPC .............. *G06F 3/016* (2013.01); *G06F 3/041* (2013.01)

(58) Field of Classification Search
  CPC ...................................... G06F 3/016
  USPC ............... 340/407.1, 407.2; 341/20, 27, 34; 345/156, 173, 178, 175; 715/702, 863; 178/18.01; 463/37; 434/114
  See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 5,977,867 A * | 11/1999 | Blouin ................... | 340/407.2 |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,337,678 B1 | 1/2002 | Fish | |
| 6,429,846 B2 | 8/2002 | Rosenberg et al. | |
| 6,690,387 B2 | 2/2004 | Zimmerman et al. | |
| 6,697,043 B1 | 2/2004 | Shahoian | |
| 6,822,635 B2 | 11/2004 | Shahoian et al. | |
| 7,009,595 B2 | 3/2006 | Roberts et al. | |
| 7,015,894 B2 | 3/2006 | Morohoshi | |
| 7,018,209 B2 | 3/2006 | Schleppenbach et al. | |
| 7,148,875 B2 | 12/2006 | Rosenberg et al. | |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Brent Swarthout
(74) *Attorney, Agent, or Firm* — Morrison & Foerster LLP

(57) ABSTRACT

Localized haptic feedback at discrete locations or regions of a surface is disclosed. Controllable haptic transmission nodes can be selectively controlled to transmit a haptic feedback signal to a surface. The nodes can be controlled between a first state that transmits the haptic feedback signal to the surface and a second state that dampens or prevents the haptic feedback signal to the surface. The nodes can be located around the perimeter of the surface, where each node can be associated with a particular location or region of the surface and can provide haptic feedback to that particular location or region when the node is selected. A touch surface of a touch sensitive device is an exemplary surface for using localized haptic feedback.

26 Claims, 15 Drawing Sheets

(56) References Cited

U.S. PATENT DOCUMENTS

| | | | |
|---|---|---|---|
| 7,184,064 B2 | 2/2007 | Zimmerman et al. | |
| 7,245,292 B1* | 7/2007 | Custy | 345/173 |
| 7,336,260 B2 | 2/2008 | Martin et al. | |
| 7,336,266 B2* | 2/2008 | Hayward et al. | 345/179 |
| 7,339,572 B2 | 3/2008 | Schena | |
| 7,663,607 B2 | 2/2010 | Hotelling et al. | |
| 7,858,891 B2 | 12/2010 | Strohband et al. | |
| 8,279,200 B2 | 10/2012 | Kikin-Gil | |
| 8,456,438 B2 | 6/2013 | Ciesla et al. | |
| 8,479,122 B2 | 7/2013 | Hotelling et al. | |
| 8,581,873 B2 | 11/2013 | Eldering | |
| 9,600,070 B2 | 3/2017 | Chatterjee et al. | |
| 2005/0110768 A1 | 5/2005 | Marriott et al. | |
| 2005/0253816 A1* | 11/2005 | Himberg et al. | 345/173 |
| 2006/0026521 A1 | 2/2006 | Hotelling et al. | |
| 2006/0073891 A1 | 4/2006 | Holt | |
| 2006/0097991 A1 | 5/2006 | Hotelling et al. | |
| 2006/0197753 A1 | 9/2006 | Hotelling | |
| 2006/0209037 A1 | 9/2006 | Wang et al. | |
| 2007/0024593 A1* | 2/2007 | Schroeder | 345/173 |
| 2007/0152977 A1 | 7/2007 | Ng et al. | |
| 2007/0152983 A1 | 7/2007 | McKillop et al. | |
| 2007/0236472 A1 | 10/2007 | Bentsen et al. | |
| 2008/0055255 A1 | 3/2008 | Griffin | |
| 2008/0111788 A1* | 5/2008 | Rosenberg et al. | 345/156 |
| 2008/0122797 A1* | 5/2008 | Soh et al. | 345/173 |
| 2008/0150911 A1* | 6/2008 | Harrison | 345/173 |
| 2008/0225012 A1* | 9/2008 | Lipovski | 345/173 |
| 2009/0021354 A1* | 1/2009 | Furusho | G06F 3/016 340/407.1 |
| 2009/0228791 A1* | 9/2009 | Kim | G06F 3/0414 715/702 |
| 2009/0303175 A1* | 12/2009 | Koivunen | A63F 13/10 345/156 |
| 2010/0085168 A1 | 4/2010 | Kyung et al. | |
| 2010/0103137 A1 | 4/2010 | Ciesla et al. | |
| 2010/0162109 A1 | 6/2010 | Chatterjee et al. | |
| 2010/0174987 A1 | 7/2010 | Shin et al. | |
| 2010/0270089 A1 | 10/2010 | Kyung et al. | |
| 2011/0007002 A1 | 1/2011 | Tsai et al. | |
| 2011/0025602 A1 | 2/2011 | Sivan et al. | |
| 2011/0102340 A1* | 5/2011 | Martin et al. | 345/173 |
| 2011/0295331 A1 | 12/2011 | Wells et al. | |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action dated Sep. 21, 2011, for U.S. Appl. No. 12/409,391, filed Mar. 23, 2009, 12 pages.

Final Office Action dated Jan. 23, 2015, for U.S. Appl. No. 12/409,391, filed Mar. 23, 2009, 14 pages.

Non-Final Office Action dated Jun. 11, 2014, for U.S. Appl. No. 12/409,391, filed Mar. 23, 2009, 13 pages.

Non-Final Office Action dated Oct. 7, 2015, for U.S. Appl. No. 12/409,391, filed Mar. 23, 2009, 13 pages.

Final Office Action dated May 19, 2016, for U.S. Appl. No. 12/409,391, filed Mar. 23, 2009, 15 pages.

Notice of Allowance dated Nov. 8, 2016, for U.S. Appl. No. 12/409,391, filed Mar. 23, 2009, nine pages.

Final Office Action dated Jan. 31, 2012, for U.S. Appl. No. 12/409,391, filed Mar. 23, 2009, 13 pages.

* cited by examiner

HAPTIC FEEDBACK SYSTEM

FIELD OF THE INVENTION

This relates to devices that provide haptic feedback at a surface and, more particularly, to haptic devices capable of providing haptic sensations at different locations across a surface such as an input/output surface.

BACKGROUND OF THE INVENTION

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface, and a display device that can be positioned behind the panel so that the touch-sensitive surface can substantially cover the viewable area of the display device. Touch screens can allow a user to perform various functions by touching the touch sensor panel using one or more fingers, a stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

The touch screen typically has a smooth touch-sensitive surface. As such, unlike standard keyboards that have physical buttons and keys that the user presses down to select, the UI virtual buttons and keys are selected merely by touching the touch screen at their displayed locations. As such, when a virtual button or key is touched, the user does not get the tactile feedback that pressing on the standard keyboard provides and must therefore watch the UI to ensure that the button or key was in fact touched.

SUMMARY OF THE INVENTION

The invention relates, in one embodiment, to a haptic feedback device. The haptic feedback device includes a plurality of controllable nodes disposed between a first and a second surface. The controllable nodes are configured to change between transmission states and a non-transmission states so as to provide a localized haptic response in discrete regions of the first surface when the second surface is powered with a haptic signal.

The invention relates, in one embodiment, to a touch sensitive device. The touch sensitive device includes touch surface having a plurality of touch regions configured to detect a touch. The touch sensitive device also includes a plurality of haptic transmission nodes positioned proximate to the touch surface. Each haptic transmission node is configured to correspond to at least one touch region and is configured to be in a transmission state so as to transmit a haptic feedback signal to the at least one corresponding touch surface region when the at least one corresponding touch surface region receives the touch.

The invention relates, in one embodiment, to a system having a touch sensitive device and a haptic device. The system includes a surface. The surface may for example be a surface that interfaces with a user. The system also includes a sensor arrangement configured to detect a location of an object in close proximity to the surface. The system additionally includes a haptic signal generator configured to produce a haptic signal when an object is detected. The system further includes a plurality of haptic transmission nodes positioned at different locations relative to the surface. The haptic transmission nodes are configured to receive the haptic signal from the haptic signal generator, and to change states in order control the transmission of the haptic signal to the surface. The haptic transmission nodes associated with the location of the object substantially transmitting the haptic signal to the surface. The haptic transmission nodes not associated with the location of the object substantially not transmitting the haptic signal to the surface.

The invention relates, in one embodiment, to a method for providing a haptic feedback signal to an input surface. The method includes identifying at least one haptic transmission node corresponding to a location of an input on the input surface. The method also includes placing the identified haptic transmission node into a transmission state. The method additionally includes generating a haptic feedback signal. The method further includes transmitting the generated haptic feedback signal via the at least one identified haptic transmission node to the location of the input on the input surface.

DETAILED DESCRIPTION OF THE PREFERRED EMBODIMENTS

This relates to providing localized haptic feedback at discrete locations or regions relative to a surface of an input and/or output device, such as a touch sensor panel, a display, or a touch screen. Haptic feedback may be provided by controllable nodes configured to selectively transmit a haptic signal (e.g., vibration) to a particular discrete location or region of the surface. The use of haptic feedback can provide an unobtrusive and effective way for a user to know that an input to a device has been received at various locations across the surface and/or for a user to know where an input can be made at various locations across the surface.

Haptics often refer to those things that relate to the sense of touch. More specifically, haptics may refer to interfaces that provide force and/or tactile sensations. In the context of electronic devices such as consumer electronic devices, haptic interfaces may provide a way for users to receive feedback from the electronic device. The feedback may for example be in the form of a physical sensation that can be felt by the user when the user interacts with some portion of the electronic device.

In the following description of preferred embodiments, reference is made to the accompanying drawings in which it is shown by way of illustration specific embodiments in which the invention can be practiced. It is to be understood that other embodiments can be used and structural changes can be made without departing from the scope of the embodiments of this invention.

Figure 1A:
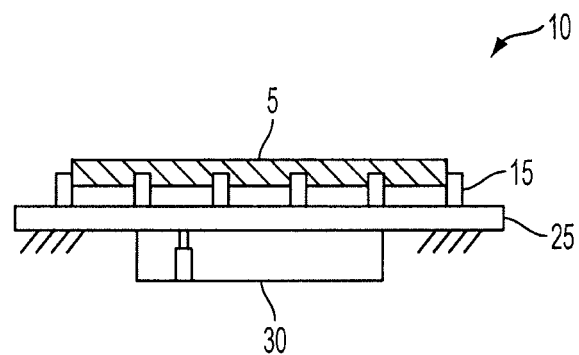
FIG. 1a illustrates a side view of an exemplary haptic system according to embodiments of the invention.
Figure 1B:
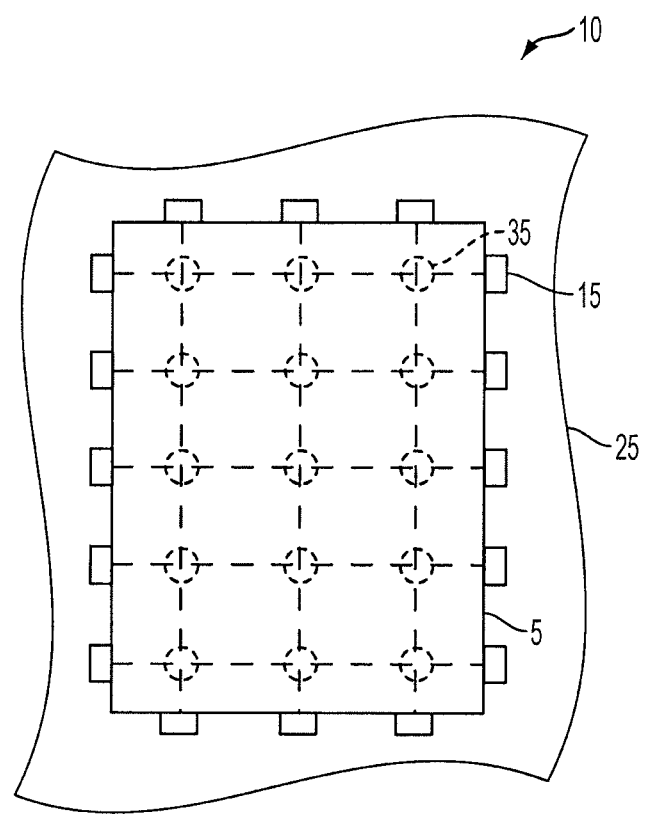
FIG. 1b illustrates a top view of the exemplary haptic system of FIG. 1a according to embodiments of the invention.

FIGS. 1*a* and 1*b* are illustrations of an exemplary haptic system in accordance with embodiments of the present invention. The haptic system 10 may be configured to provide a haptic response. The haptic system 10 may for example cooperate with an input and/or output device such as a touch sensor panel, a display, or a touch screen in order to provide a haptic response to the input and/or output device. The haptic response may for example be associated with a particular input and/or output of the input and/or output device.

As shown, the haptic system 10 may include a plurality of haptic transmission nodes 15 and a haptic signal generator 30. The haptic transmission nodes 15 may be disposed between a touchable surface 5 and a fixed structure 25 that may be spatially separated from one another. In some embodiments, the nodes 15 may support the surface 5 relative to the fixed structure 25. The surface 5 may for example be associated with an input and/or output platform and the fixed structure 25 may for example be associated with a printed circuit board, frame, housing or the like. The shape of the surface 5 may be widely varied. For example, it can be flat (as shown) or curved.

The haptic signal generator 30 may be configured to produce a haptic signal and may be coupled directly or indirectly to the fixed structure 25 such that the haptic signal may travel via the fixed structure 25. The haptic transmission nodes 15, which may be coupled to the fixed structure 25 and the surface 5, may be configured to transmit the haptic signal to the surface 5 so as to provide a physical sensation at the surface 5. The sensation may for example be associated with a detected touch or near touch relative to the surface 5. The sensation may even be associated with an input/output event that occurs at the surface 5.

As shown, the haptic transmission nodes 15 may be distributed about the perimeter of the surface 5. In some embodiments, the haptic transmission nodes 15 may be placed at or near the edge of the surface 5. The nodes 15 may be configured to direct the haptic signal into the surface 5 as for example in a direction away from the edge of the surface 5. In some embodiments, the haptic signal may even be directed along imaginary or real meridian lines (shown in broken lines) that traverse the surface 5. The meridian lines may for example be oriented in horizontal and vertical directions. Although shown as straight lines, the meridian lines may take a variety of forms depending on the needs of the system. In some embodiments, the haptic transmission nodes 15 may be positioned directly across from one another on opposite sides of the surface 5. The nodes 15 may for example cooperate to form a meridian line or be aligned with a meridian line and thus each other. The number and pitch of the haptic transmission nodes 15 about the perimeter may be widely varied (depends on desired resolution of haptic feedback). As should be appreciated, in some cases (as shown), the haptic transmission nodes 15 may be configured to form a matrix of rows and columns across the surface 5. It should be appreciated, however, that this is not a limitation and that other configurations may be used.

In some embodiments, the surface 5 may include a waveguide to help encourage the haptic signal to travel to a desired location within the surface 5. The waveguide may for example help form the meridian lines. The waveguide may take a variety of forms including mechanisms that are embedded, applied or formed into or on the surface 5. The mechanisms may for example include channels, passages, protrusions, and/or wires that can be placed within or along the backside of the surface 5 and that may extend between opposing haptic transmission nodes 15.

In accordance with one embodiment, the haptic transmission nodes 15 may be configured to change states in order to control the transmission of the haptic signal to the surface 5. The states may be analog, e.g., having a plurality of states from a full transmission state to a full non-transmission state, or binary, e.g., having only a transmission state and a non-transmission state. For ease of discussion, binary is primarily described herein. In some embodiments, for example, the haptic transmission nodes 15 may be configured to selectively change between a transmission state and non- or near non-transmission state. In the transmission state, the haptic transmission nodes 15 may transmit the haptic signal to the surface 5 such that a physical sensation can be felt at the surface 5. In the non-transmission state, the haptic transmission nodes 15 may not substantially transmit the haptic signal to the surface 5 such that a physical sensation is not easily felt or not felt at all at the surface 5. The haptic transmission nodes 15 may be selectively adjusted such that any haptic transmission node 15 may be in any state at any time. By selectively controlling the state of each haptic transmission node 15 while a haptic signal is generated, the haptic system 10 may produce controlled physical sensations at the surface 5. The location of the physical sensation may be associated with the location of the haptic transmission nodes 15 relative to the surface (e.g., along the meridians).

In some embodiments, the haptic system 10 may produce localized and discrete physical sensations 35 at different locations across the surface 5. That is, the haptic system 10 may be able to produce a pixel based haptic response at the surface 5. This may for example be accomplished by changing the states of the haptic transmission nodes 15 in order to direct the haptic signal along a select group of meridians. For example, it is believed that a localized haptic response may be generated along or at an intersection of meridians by placing those haptic transmission nodes 15 associated with the meridians in the transmission state while holding the rest in the non-transmission state. This will be described in greater detail below.

The haptic transmission nodes 15, particularly the ability to change states, may be widely varied. The haptic transmission nodes 15 may dampen the haptic signal, may partially or entirely decouple the connection between the surface 5 and the fixed structure 25 and/or the like. The nodes 15 can for example change between be loose/rigid, coupled/decoupled, free/fixed, stiff/flexible, expand/contract, charged/uncharged, and/or like.

In one example, the nodes 15 may embody a rigid and loose state while maintaining connection to the surface 5 and the fixed structure 25. That is, the node 15 may control the rigidity of the connection between the surface 5 and the fixed structure 25. In the rigid state, the node 15 may rigidly lock/secure the surface 5 to the fixed structure 25. The rigid state may then provide a path for the haptic signal to the surface 5 from the fixed structure 25 via the haptic signal generator 30. In the loose state, the node 15 may provide limited play or slack while still maintaining a connection between the surface 5 and the fixed structure 25 (i.e., may float between the surface and the fixed structure). The loose state then may not provide a path for the haptic signal and as a result the haptic signal may not travel to the surface 5.

In some embodiments, the nominal state or standard operating condition for this example is the rigid state (so that the surface is more structurally stable). During a haptic response, a control signal may be sent to select nodes 15 to place them in a loose state. At the same time, the haptic signal may be produced. The haptic signal may travel through the nodes 15 in the rigid state to the surface 5 thereby producing a localized physical sensation relative to the location of the rigid nodes 15. The nodes 15 in the loose state may absorb or otherwise prevent the haptic signal from affecting the surface 5 and thus a physical sensation may not be substantially created in the location of the loose nodes 15. After the haptic response, the loose nodes 15 may assume the standard state of rigid. See for example FIG. 3a.

In another example, which may operate similarly, the nodes 15 may change their attributes such as shape, temperature, electrical makeup, density, and the like in order to open and close the path and/or alternatively dampen the signal traveling on the path (e.g., reduce the signal). See for example FIG. 3b.

In yet another example, which may operate similarly, the nodes 15 may act as a switch that can couple the node to the surface 5 thereby allowing transmission to take place and decouples the node from the surface thereby preventing transmission from taking place. See for example FIG. 3c.

In yet another example, which may operate similarly, the nodes 15 may expand and contract in order to open and close the path and/or alternatively to dampen the signal traveling on the path (e.g., reduce the signal). See for example FIG. 3d.

In yet another example, which may operate similarly, the nodes 15 may flex in order to open and close the path and/or alternatively dampen the signal traveling on the path (e.g., bend dampens, straight provides a path). See for example FIGS. 3e and 3f.

The haptic transmission nodes 15 may include one or more components to effect the change of state. In some embodiments, the haptic transmission nodes 15 may include a bar disposed between the surface 5 and the fixed structure 25. The bar itself may be configured to change states. The bar may for example be formed from a shape memory material such as nitinol. Alternatively, the haptic transmission nodes 15 may additionally include a driver that may change the state of the bar. The driver may for example be a microelectromechanical (MEM) device or a piezoelectric device. In either case, the node 15 may be provided with a control signal in order to change its state. The control signal may for example be provided by a haptic controller, which may be stand alone or integrated with other controllers, etc.

Although a single signal generator may provide some benefits (e.g., space requirements, cost, etc.), it should be appreciated that multiple signal generators may be used. Each generator may generate similar or different haptic signals depending on needs of system (e.g., different frequencies or wavelengths). In one example, the system may include an X generator and a Y generator. The X generator may be configured to drive the horizontally configured nodes, while the Y generator may be configured to drive the vertically configured nodes. In some cases, multiple generators may be coupled to the same fixed structure, while in other cases multiple generators may be coupled to different fixed structures so as not to substantially affect one another.

Furthermore, in some embodiments, the haptic transmission nodes 15 may solely support the surface 5 relative to the fixed structure 25. That is, the nodes 15 themselves may support and spatially separate the surface 5 from the fixed structure 25. In cases such as these, there may be a minimum number of nodes 15 that may be required to be in contact with the surface. This may for example be two opposing horizontal nodes 15 and two vertical opposing nodes. The minimum may even be greater than that to prevent an unstable surface 5 especially a surface that may be used for inputting (e.g., receives a force thereon). In an alternate embodiment, the system 10 may further include an additional support system that may cooperate with the nodes 15 to support the surface 5 or a support system that may provide a majority if not all of the support to the surface. In these examples, the support system may be configured as a dampener such that it may reduce its impact during a haptic response. In one example, the support system may include one or more dampener members. The dampener members may be node based similar to the haptic transmission nodes 15 or they may be layers, which can be disposed below the surface. In one example, the dampener members may be formed from foam.

As mentioned above, the physical sensation produced by the haptic system 10 may be associated with a detected touch or near touch relative to the surface. For example, the detected touch may drive the haptic system 10 to produce a haptic response in conjunction with a touch or near touch event. In fact, the haptic response may be configured to provide the haptic response proximate the touch or touch event. The touch detection system may be widely varied. It may be integrated with the haptic system 10 or it may be separate from the haptic system altogether. Various sensing technologies may be used to detect the touch or near touch. Examples include optical sensing, touch sensing, force sensing, and/or the like. The sensing mechanism may also serve to provide inputs to a host device. It should be appreciated that detecting a touch is not a limitation and that the haptic system may work independent of detecting a touch. For example, the haptic system may be used to define an input layout. It can also define an input layout and further provide a haptic response when an input is selected.

In accordance with one embodiment, the surface 5 may be associated with an outer platform of an input and/or output device. In some embodiments, for example, the input/output (I/O) device may include a touch sensing mechanism for inputting (e.g., touch pad). In some embodiments, the I/O device may include a display such as a flat panel display for outputting (e.g., LCD). In some embodiments, the I/O device may be a touch screen that can integrate a touch sensing mechanism and a display into a single device. In all of these cases, the platform may form the outer surface for interfacing with a user. Several examples of touch sensing devices will be described below (e.g., FIGS. 4*a* and 4*b*).

In one example, the haptic system 10 may receive a signal that may indicate that an object is close or is touching the surface as well as the location of the object relative to the surface. In response to the signal, the haptic system 10 may activate the appropriate haptic transmission nodes 15 associated with the location and may generate a haptic signal. The nodes 15 that may be active may transmit the haptic signal to the surface 5 at the location.

Additionally or alternatively, the haptic system 10 may receive a signal that an input has been received from an input device. In response to the signal, the haptic system 10 may activate the appropriate haptic transmission nodes 15 associated with the location of the input and generates a haptic signal. The nodes 15 that may be active may transmit the haptic signal to the surface 5 at the location of the input. The user doing the inputting therefore may be provided with feedback about the input.

Additionally or alternatively, the haptic system 10 may receive a signal that may define various regions of the surface 5. The haptic system 10 may activate the appropriate haptic transmission nodes 15 associated with the regions and may generate a haptic signal. The nodes 15 that may be active may transmit the haptic signal to the region. Alternatively, the appropriate haptic transmission nodes 15 may not be associated with the regions but instead an area about the regions of interest. The regions may for example correspond to input locations relative to an input device. In this example, the nodes may be active prior to a detected touch or input.

In accordance with one embodiment, the nodes 15 may additionally be configured to carry signals for the I/O device. For example, the fixed structure 25 may be a circuit board and the nodes 15 may carry a signal path (e.g., traces) between components mounted on the board such as chips and other circuitry to the surface 5 which may include display components and/or sensing components.

Figure 2:
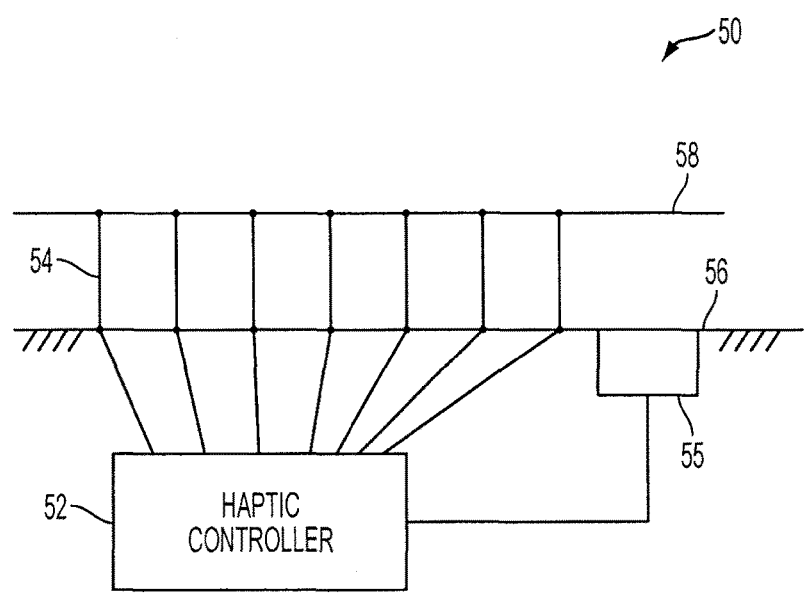
FIG. 2 illustrates a block diagram of an exemplary haptic system according to embodiments of the invention.

FIG. 2 illustrates a block diagram of an exemplary haptic system according to embodiments of the invention. The haptic system 50 may generally correspond to the haptic system 10 shown in FIGS. 1*a* and 1*b*. The haptic system 50 may include a haptic controller 52 that may be operatively coupled to a plurality of haptic transmission nodes 54 and one or more haptic signal generators 55 (e.g., vibration motor). The one or more haptic signal generators 55 may be configured to produce a haptic signal (e.g., vibration). The haptic transmission nodes 54 and one or more haptic signal generators 55 may be haptically connected to a surface 56 such that a generated haptic signal may be distributed to the haptic transmission nodes 54 (e.g., vibration may travel through the surface from the generator to the nodes). In one embodiment, the haptic transmission nodes 54 may be configured to substantially transmit the haptic signal to a second surface 58 when deactivated and to not substantially transmit a haptic signal to the second surface when activated (or vice versa). This may generally be accomplished under the supervision of the haptic controller 52. During operation, the haptic controller 52 may receive a control signal indicating a desired haptic response. This may for example be based on a detected signal such as a touch signal from a touch sensor(s). After receiving the control signal, the haptic controller 52 may direct the appropriate nodes 54 to activate/deactivate and may direct the haptic signal generator 55 to power up and generate a haptic signal. The haptic controller 52 may control the attributes of the haptic signal (e.g., frequency, wavelength, time, etc.). The nodes 54 that may be active may allow that haptic signal to pass through the node 54 to the second surface 58. The nodes 54 may be controlled in a manner that may provide the desired haptic response. In some embodiments, through selective control of the nodes 54, a haptic response may be tied to a particular location, i.e., a location associated with the active nodes.

FIGS. 3*a* through 3*f* illustrate various states of exemplary haptic transmission nodes according to embodiments of the invention. Haptic transmission nodes 70 may generally correspond to any of those haptic transmission nodes described herein, including for example the nodes described in FIGS. 1*a*, 1*b*, and 2. As mentioned previously, the haptic transmission nodes 70 may be configured to change states in order to control the transmission of the haptic signal to a surface. The nodes 70 may be configured to selectively change between a transmission state and non- or near non-transmission state. In the transmission state, the haptic transmission nodes 70 may transmit the haptic signal to the surface such that a physical sensation can be felt at the surface. In the non-transmission state, the haptic transmission nodes may not substantially transmit the haptic signal to the surface such that a physical sensation is not easily felt or not felt at all at the surface. As shown in all of these embodiments, one end of the node 70 may be connected to a fixed structure 72 while the opposite end may or may not be connected to a surface 74, depending on the embodiment.

Figure 3A:
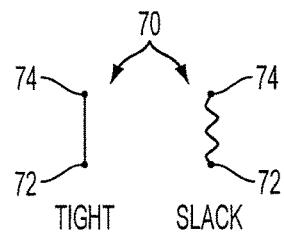
FIGS. 3a through 3f illustrate various states of exemplary haptic transmission nodes according to embodiments of the invention.

As shown in the example of FIG. 3*a*, the node 70 may be configured to change between a rigid (tight) and loose (slack) state. The rigid state may be configured to allow transmissions to the surface 74 while the loose state may be configured to prevent or reduce transmissions (e.g., dampen) to the surface 74.

Figure 3B:
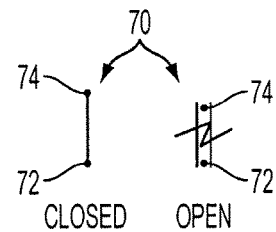

As shown in the example of FIG. 3*b*, the node 70 may be configured change its physical structure or attributes in order to open and close the path and/or alternatively dampen the signal traveling on the path (e.g., reduce the signal). The closed path (shown with one line) may be configured to allow transmissions to the surface 74 while the open state (shown with two lines) may be configured to prevent or reduce transmissions (e.g., dampen) to the surface 74.

Figure 3C:
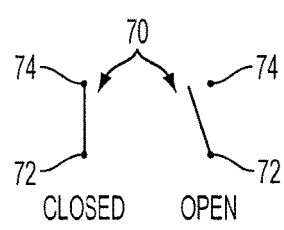

As shown in the example of FIG. 3*c*, the node 70 may be configured move between an open and close position. The closed position may be configured to allow transmissions to the surface 74 while the open position may be configured to prevent or reduce transmissions (e.g., dampen) to the surface 74.

Figure 3D:
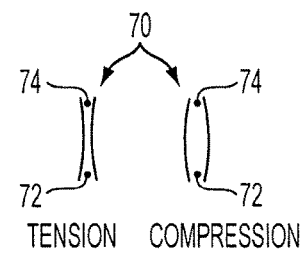

As shown in the example of FIG. 3d, the node 70 may be configured to change between a tension state and a compression state in order to affect the transmissions between the fixed structure 72 and the surface 74.

Figure 3E:
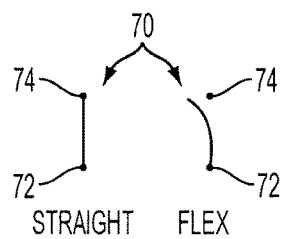

As shown in the example of FIG. 3e, the node 70 may be configured to flex between a closed and an open position similar to the example shown in FIG. 3c.

Figure 3F:
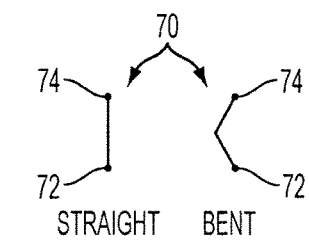

As shown in the example of FIG. 3f, the node 70 may be configured to bend in order to affect the transmissions between the fixed structure 72 and the surface 74. For example, the node 70 may contract between a straight and a bent configuration. In the straight configuration, the node 70 may be configured to allow transmissions to the surface 74, while in the bent state, the node 70 may be configured to prevent or reduce transmissions (e.g., dampen) to the surface 74.

It should be appreciated that these examples are not a limitation and that the node may have a variety of configurations that are not shown.

Figure 4A:
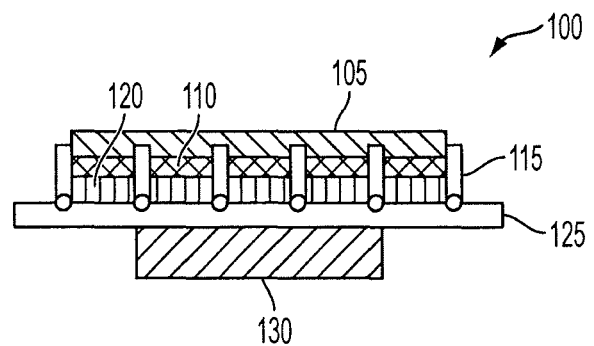
FIG. 4a illustrates a side view of an exemplary touch sensitive device with haptic feedback according to embodiments of the invention.

FIG. 4a illustrates a side view of an exemplary touch sensitive device with haptic feedback according to embodiments of the invention. The touch sensitive device may for example utilize the haptic system described in FIGS. 1a and 1b. In the example of FIG. 4a, touch sensitive device 100 may include touch surface 105, touch module 110, haptic transmission nodes 115, display module 120, circuit board 125, and haptic signal generator 130. The touch surface 105 may have a front side to receive a touch and a back side opposite the front side. The touch module 110 may be disposed adjacent to the back side of the touch surface 105 and include touch pixels for detecting a touch received on the front side of the touch surface. The display module 120 may be disposed adjacent to the back side of the touch module 110 and comprise a liquid crystal display to display a user interface, e.g., virtual buttons the user touches to select various functions to be performed by the touch sensitive device 100. In other embodiments, the touch module 110 may be partially or completely integrated within the layers of the display module 120. The circuit board 125 may be disposed adjacent to the back side of the display module 120 and include circuitry for performing the selected functions and other operations of the touch sensitive device 100. In some embodiments, the touch sensitive device may include a cover glass member that can overlay the touch surface.

The haptic transmission nodes 115 may be disposed adjacent to the circuit board 125 at one end and to the touch surface 105 at the other end to provide haptic feedback to the touch surface. The haptic transmission nodes 115 may transmit a haptic feedback signal to the touch surface 105 at the location where the user touches the touch surface so as to provide some tactile feedback to the user.

In some embodiments, the haptic transmission nodes 115 may include at least two components—an electromechanical device and a movable bar. The electromechanical device (symbolically illustrated by the circles in FIG. 4a) may be disposed adjacent to the circuit board 125 and in electrical communication therewith. Examples of the electromechanical device may include microelectromechanical (MEM) devices, piezoelectronics, and other suitable such miniature devices. The movable bar (symbolically illustrated by the vertical bars attached to the circles in FIG. 4a) may be attached to the electromechanical device at one end and free at the other end to be proximate to the touch surface 105. Examples of the movable bar may include a metal, a polymer, or any other material suitable to be made rigid to transmit haptic feedback. The haptic transmission nodes 115 may have a plurality of dynamic loose and rigid states. The nodes 115 may have two states—a rigid state and a loose state. Alternatively, the nodes 115 may have multiple states ranging from a fully loose state to a fully rigid state. The nodes 115 may be configured to selectively change states in order to control the haptic feedback signal propagating through the nodes. The nodes 115 may function as controllable dampeners, for example, where the nodes in a rigid state can transmit the haptic feedback signal and the nodes in a loose state substantially can not transmit the haptic feedback signal.

The haptic signal generator 130 may be disposed adjacent to the circuit board 125 and in electrical communication therewith to generate a haptic signal. The haptic signal generator 130 may send a haptic signal to particular haptic transmission nodes 115 when the touch sensitive device 100 receives a touch, e.g., to those nodes corresponding to the touch locations on the touch sensitive device 100. This will be described more below. In some embodiments, the haptic signal may be a vibration wave. Hence, the haptic signal generator 130 may be a vibration motor. In some embodiments, the haptic signal may be an electrical or mechanical pulse. Hence, the haptic signal generator 130 may be a pulse generator. Other suitable haptic signals and corresponding haptic signal generators may be used according to embodiments of the invention.

It is to be understood that the touch sensitive device is not limited to the structure shown in FIG. 4a, but may include other components suitable for providing haptic feedback according to embodiments of the invention. In addition, the haptic transmission nodes and haptic signal generator are not limited to use with a touch sensitive device, but may be used with other devices suitable for providing haptic feedback according to embodiments of the invention.

Figure 4B:
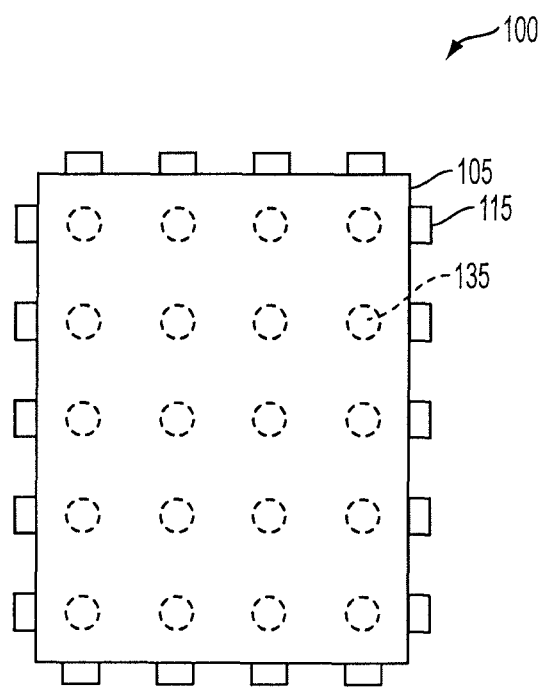
FIG. 4b illustrates a top view of the exemplary touch sensitive device of FIG. 4a according to embodiments of the invention.

FIG. 4b illustrates a top view of the exemplary touch sensitive device of FIG. 4a according to embodiments of the invention. In the example of FIG. 4b, haptic transmission nodes 115 may be disposed around a perimeter of touch surface 105 where each node may be across the perimeter from another node. By being disposed around the perimeter of the touch surface 105, the haptic transmission nodes 115 can advantageously avoid taking up space on the touch sensitive device for other components, avoid making direct contact with components that may not be adversely affected by the haptic feedback signal, and have direct contact with the touch surface. The underlying touch module (element 110 in FIG. 4a) may include touch pixels 135 to detect a touch received on the touch surface 105. Here, the touch pixels 135 may form an array of rows and columns. The haptic transmission nodes 115 may be aligned with the rows and columns of the array. Those nodes 115 aligned with a column may transmit a haptic feedback signal to a location on the touch surface 105 along that column. Similarly, those nodes 115 aligned with a row may transmit a haptic feedback signal to a location on the touch surface 105 along that row. Therefore, when a touch is detected at a particular touch pixel 135, the location of the detected touch involves the nodes 115 at both ends of the touch pixel's row and the nodes 115 at both ends of the touch pixel's column, thereby transmitting a haptic feedback signal from four nodes to that location to provide localized haptic feedback at that discrete location. In some embodiments, the haptic transmission nodes 115 may be aligned with all the rows and columns of the touch pixel array as illustrated in FIG. 4b. In some embodiments, the haptic transmission nodes 115 may be spaced several rows and columns apart to align with some of the rows and columns of the touch pixel array, where each haptic transmission node 115 can correspond to several touch pixels. In some embodiments, the haptic transmission nodes 115 may be aligned with the spaces between the rows and columns of the touch pixels, where each haptic transmission node 115 can correspond to adjacent touch pixels. Other configurations, e.g., resolutions and pitches, of the haptic transmission nodes 115 may also be possible.

It should be appreciated that although the example of FIGS. 4a and 4b is described as above, it may include some or all of the features described in FIGS. 1a through 3f.

FIGS. 5a through 5g illustrate various states of exemplary haptic transmission nodes for an exemplary touch sensitive device according to embodiments of the invention. The exemplary haptic transmission nodes may generally correspond to any of those haptic transmission nodes described herein including for example the nodes described in FIGS. 1a through 4. The haptic transmission nodes 115 may be configured to change states in order to control the transmission of the haptic signal to the touch surface 105. The nodes 115 may be configured to selectively change between a transmission state and non- or near non-transmission state. In the transmission state, the haptic transmission nodes 115 may transmit the haptic signal to the surface 105 such that a physical tactile sensation can be felt at the surface. In the non-transmission state, the haptic transmission nodes 115 may not substantially transmit the haptic signal to the surface 105 such that a physical tactile sensation is not easily felt or not felt at all at the surface.

In some embodiments, the node 115 may include a driver that moves a bar between a transmission state and a non-transmission state. The driver may for example be an electromechanical device and the movable bar may be rigid material. The driver may be attached or otherwise connected to a fixed structure that includes a haptic signal generator. In one example, the driver may rotate the bar so as to dynamically provide various coupled and decoupled states, as illustrated in FIGS. 5a and 5b.

Figure 5A:
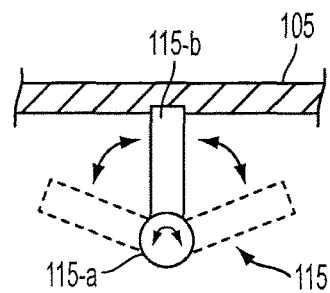
FIGS. 5a through 5g illustrate various states of exemplary haptic transmission nodes of an exemplary touch sensitive device according to embodiments of the invention.
Figure 5B:
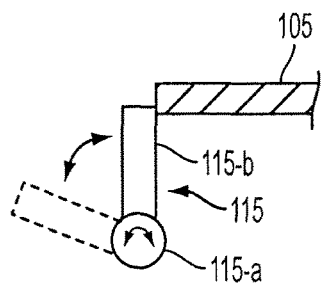

In the example of FIG. 5a, the driver 115-a (symbolically illustrated by the circle in FIG. a) may rotate or tilt or otherwise move the movable bar 115-b (symbolically illustrated by the bar in FIG. 5a) between a coupled position (shown by solid lines in FIG. 5a) and a decoupled position (shown by dashed lines in FIG. 5b). In the coupled position, the bar 115-b may be placed in an upright position in direct contact with the touch surface 105 (thereby allowing a haptic signal to be transmitted). In some cases, the bar 115-b may even be secured to the surface 105. For example, a mechanism may lock the bar 115-b to the surface 105 when in contact (e.g., snaps, latches, locks, friction couplings, detents, catches, magnets, etc.). When in direct contact and/or locked, the movable bar 115-b may be better able to transmit a haptic feedback signal to the surface 105. In the decoupled position, the bar 115-b may be positioned away from and not in contact with the surface 105 (thereby preventing a haptic signal from being transmitted).

Like the example of FIG. 5a, in FIG. 5b, the driver 115-a may rotate or tilt or otherwise move the movable bar 115-b between a coupled position (shown by solid lines) and a decoupled position (shown by dashed lines). In this particular example, in the decoupled position, the driver 115-a may position the movable bar 115-b in a leaning position at an angle to the edge of the touch surface 105, and in the coupled position, the driver may rotate the bar in an upright position in direct contact with the surface. In some cases, similarly to above, the bar may even be secured to the surface 105. For example, a mechanism may lock the bar 115-b to the surface 105 when in contact (e.g., snaps, latches, locks, friction couplings, detents, catches, magnets, etc.). When in direct contact and/or locked, the movable bar 115-b may be better able to transmit a haptic feedback signal to the surface 105.

Figure 5C:
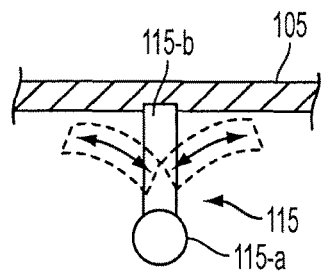
Figure 5D:
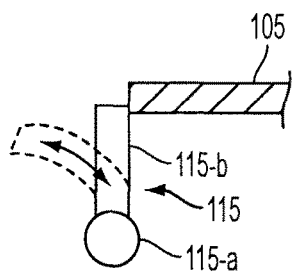

In some embodiments, the bar 115-b may be flexible or have flexible or elastic components that are capable of stretching/squeezing when moved. In this embodiment, as shown in FIGS. 5c and 5d, the end of the bar 115-b may be fixed to the touch surface 105 such that any rotation by the driver 115-a may cause the bar to stretch/squeeze thereby placing the bar in various states of tension/compression, which can affect the transmission of the haptic signal. Alternatively, the bar 115-b may be free from the surface 105 and instead use the flexible nature of the bar to provide a bias against the surface when the driver 115-a moves the bar against the surface. In addition, this aforementioned embodiment may allow the flexible bar 115-b to be moved away from the surface 105 similar to FIGS. 5a and 5b.

Figure 5E:
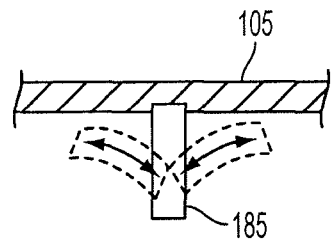
Figure 5F:
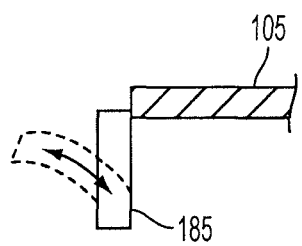
Figure 5G:
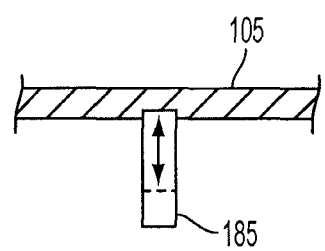

In some embodiments, the node 115 may be a dynamic shape-memory material having a plurality of states, as illustrated in FIGS. 5e, 5f, 5g. The material may change its state when a stimulus is applied and return to its original state when the stimulus is reduced or terminated. The material may have two states—a bent state and an upright state. An example material may include nitinol. In the example of FIG. 5e, the material 185 (symbolically illustrated by the bar in FIG. 5e) may naturally flex or bend (a loose state) parallel to the side face of the touch surface 105 until a stimulus is applied to make the material rigid and straight in an upright position (a rigid state) in direct contact with the touch surface. Example stimuli may include electrical current, heat, or any suitable stimulus capable of changing such a material. In the example of FIG. 5f, the material 185 may naturally flex (a loose state) at an angle to the side face of the touch surface 105 until a stimulus is applied to make the material rigid and straight in an upright position (a rigid state) in direct contact with the touch surface. In the example of FIG. 5g, the material 185 may be naturally shrunken (a loose state) and out of contact with the touch surface 105 until a stimulus is applied to make the material rigid and elongated in an upright position (a rigid state) in direct contact with the touch surface. When rigid, straight, and/or elongated to directly contact the touch surface 105, the material 185 may be better able to transmit a haptic feedback signal to the touch surface.

Figure 6A:
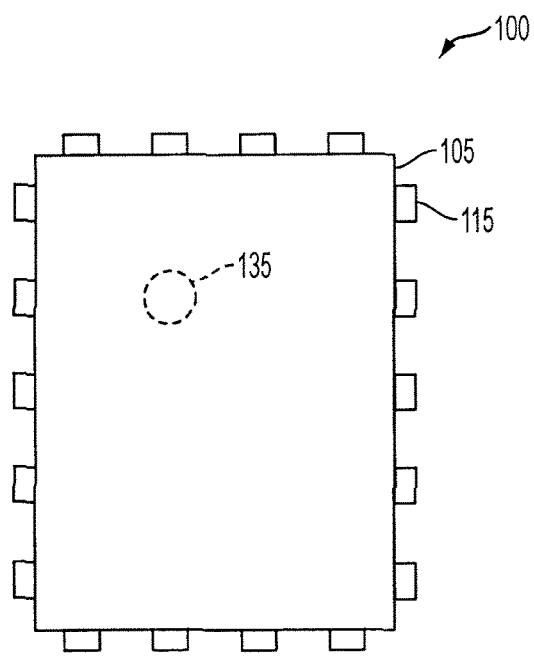
FIG. 6a illustrates a touch location on an exemplary touch sensitive device according to embodiments of the invention.
Figure 6B:
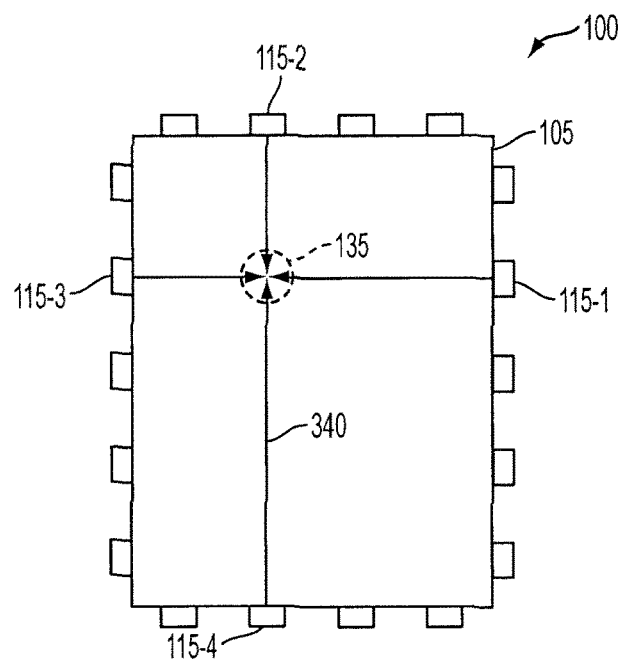
FIG. 6b illustrates haptic feedback at a touch location on an exemplary touch sensitive device according to embodiments of the invention.

FIGS. 6a and 6b illustrates a touch location on an exemplary touch sensitive device and haptic feedback at the touch location according to embodiments of the invention. This figure may generally correspond any of the embodiments described herein including FIGS. 1, 2, and 4 (as well as those mentioned below). In the example of FIG. 6a, a touch may be detected by the touch pixel 135 at a location on the touch surface 205. In the example of FIG. 6b, haptic transmission nodes 115-1 through 115-4, which are aligned with the row and column of the touch pixel 135 that detects the touch, may transmit haptic feedback signals 340 to the touch surface 105 at the touch location while the remaining nodes may be placed in a non transmission state. Here, four haptic feedback signals 340 may be transmitted to the touch location and combined to provide haptic feedback to a user. To combine, the signals 340 may have the same or compatible phases and/or frequencies to be additive and avoid canceling each other out. For example, a vibration wave transmitted by nodes 115-1 through 115-4 may have the same or compatible phases and/or frequencies such that the transmissions may be added at the touch pixel 135 to provide a stronger vibration wave. In some embodiments, the haptic transmission nodes 115 may be spaced sufficiently apart, e.g., at quarter- or half-wavelengths, to ensure that the signals 340 have compatible frequencies at the touch pixel 235. In some embodiments, the haptic transmission nodes 115 may have phase delays, e.g., 45° or 90°, which may be selectively applied to ensure that the signals 340 have compatible phases at the touch pixel 135. Other suitable approaches may be used to ensure that the signals are combined at the touch location. Though other locations along the row with nodes 115-1 and 115-3 and along the column with nodes 115-2 and 115-4 may receive the transmitted haptic feedback signals 340, their signals may be negligible compared to the feedback occurring at the touch location where the four signals 340 intersect and combine.

In some embodiments where there are more rows and columns of touch pixels than there are corresponding haptic transmission nodes or where the touch pixels are not aligned with the haptic transmission nodes, those haptic transmission nodes which best intersect the touch location or are best associated with the touch location may transmit haptic feedback signals to the touch surface at the touch location.

Figure 7:
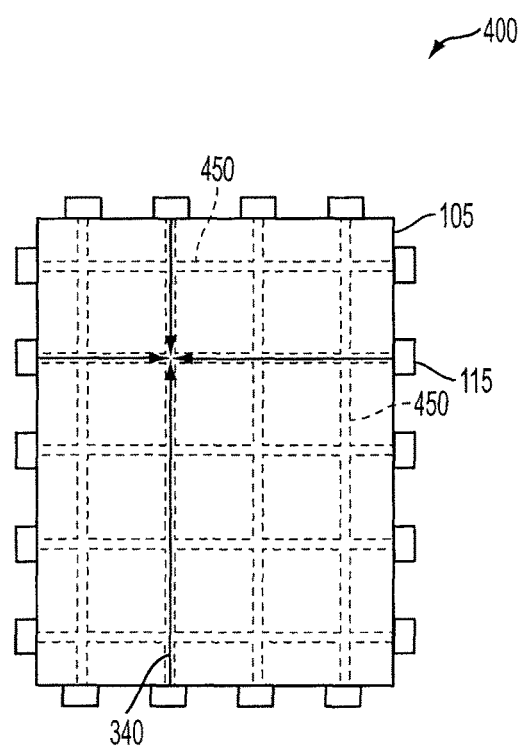
FIG. 7 illustrates an exemplary channel waveguide on an exemplary touch sensitive device for transmitting haptic feedback according to embodiments of the invention.

FIG. 7 illustrates an exemplary channel waveguide on an exemplary touch sensitive device for transmitting haptic feedback according to embodiments of the invention. In the example of FIG. 7, channel waveguide 450 (symbolically illustrated by dotted lines in FIG. 7) with rows and columns of channels may be disposed on the back side of the touch surface 105, where the channels may be aligned with the haptic transmission nodes 115 and the intersections of the channels' rows and columns may correspond to the locations of the touch pixels 135. The channel waveguide may transmit haptic feedback signals 340 along the channels, thereby reducing the scattering of the signals to locations adjacent to the touch location. Alternative to channels, the waveguide 450 can have holes, ridges, protrusions, or lines disposed on the back side of the touch surface 105 or embedded in the touch surface to transmit the haptic feedback signals 340.

Figure 8:
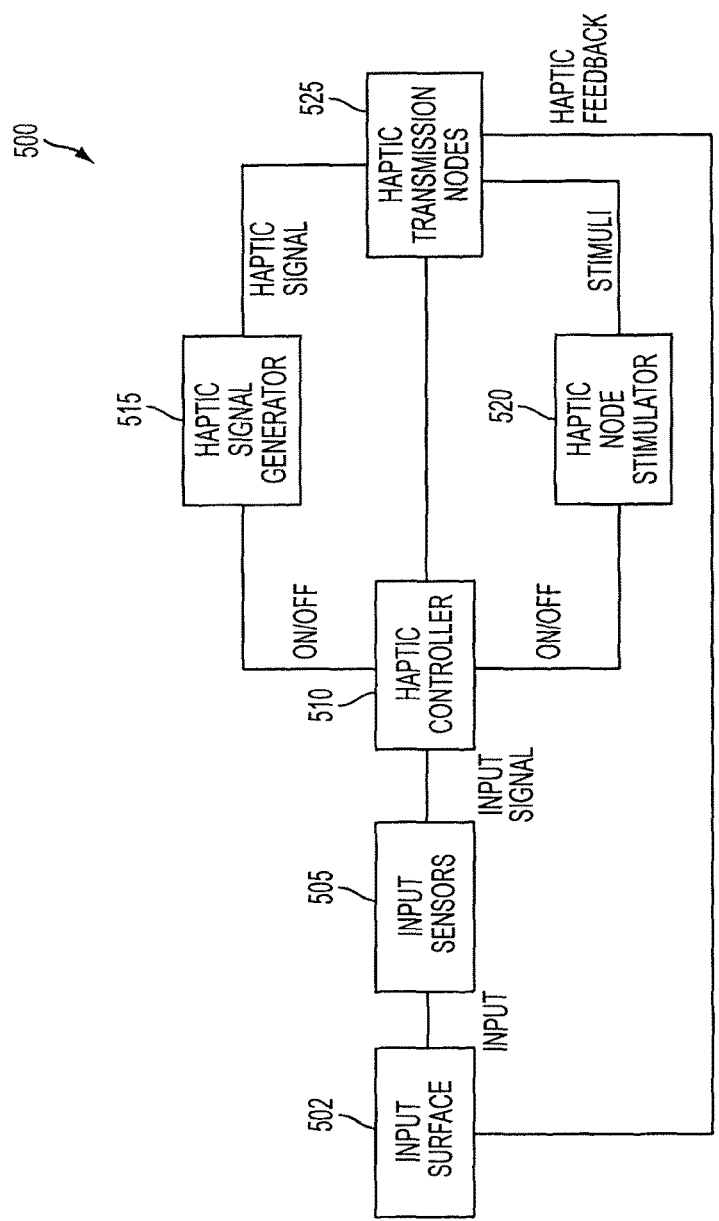
FIG. 8 illustrates an exemplary haptic feedback circuit for a haptic system according to embodiments of the invention.

FIG. 8 illustrates an exemplary haptic feedback circuit for a haptic system according to embodiments of the invention. The exemplary haptic feedback circuit may generally correspond to any of the haptic systems described herein. In the example of FIG. 8, haptic feedback circuit 500 may include input surface 502, input sensors 505, haptic controller 510, haptic signal generator 515, haptic node stimulator 520, and haptic transmission nodes 525. The input surface 502 may receive an input, e.g., a touch. The input surface 502 may be in communication with the input sensors 505 to transmit the input. The input surface 502 may also be in communication with the haptic transmission nodes 525 to receive haptic feedback in response to the input. The input sensors 505, e.g., touch pixels, may detect the input received by the input surface 502. The input sensors 505 may be in communication with the haptic controller 510 to transmit information about the detected input to the controller, e.g., the location of the touch on the touch surface.

The haptic signal generator 515, e.g., a vibration motor, may generate a haptic signal, e.g., a vibration wave. The haptic signal generator 515 may be in communication with the haptic controller 510 to receive control signals to either start or stop generating haptic signals. The haptic signal generator 515 may also be in communication with the haptic transmission nodes 525 to transmit generated haptic signals to the nodes. The haptic node stimulator 520 may generate a stimulation signal, e.g., electrical current, to stimulate the haptic transmission nodes 525. The haptic node stimulator 520 may be in communication with the haptic controller 510 to receive control signals to either start or stop generating the stimulation signal. The haptic node stimulator 520 may also be in communication with the haptic transmission nodes 525 to transmit the generated stimulation signals to the nodes.

The haptic transmission nodes 525 may transmit a haptic signal to an input surface. The haptic transmission nodes 525 may be in communication with the haptic controller 510 to receive control signals regarding which nodes are to be stimulated and/or transmit the haptic signals. The haptic transmission nodes 525 may also be in communication with the haptic signal generator 515 to receive the generated haptic signals and with the haptic node stimulator 520 to receive the node stimulation signals. The haptic transmission nodes 525 may further be in communication with the input surface 502 to transmit the haptic signals as feedback in response to an input on the input surface.

The haptic controller 510 may control the haptic feedback process. The haptic controller 510 may include a processor to perform the control. The haptic controller 510 may be in communication with the input sensors 505 to receive information about the input. The haptic controller 510 may also be in communication with the haptic signal generator 515 to send control signals to start or stop generating haptic signals and with the haptic node stimulator 520 to send control signals to start or stop generating node stimulation signals. The control signals may include ON/OFF signals. The control signals may also include the identification of the haptic transmission nodes 525 to be stimulated to transmit the haptic signals to the input surface 502. The haptic controller 510 may further be in communication with the haptic transmission nodes 525 to send control signals regarding the nodes to be stimulated and/or transmit the haptic signals to the input surface 502.

In some embodiments, all of the haptic transmission nodes may receive the generated haptic signals from the haptic signal generator. In such embodiments, only those that are stimulated may sufficiently transmit the haptic signals as feedback. The haptic signals received by the unstimulated nodes may be attenuated or otherwise prevented from transmitting to the input surface. In other embodiments, the system works oppositely where only those that are stimulated may be attenuated or otherwise prevented from transmitting to the input surface and the haptic signals received by the unstimulated nodes may sufficiently transmit the haptic signals as feedback.

In some embodiments, only the stimulated haptic transmission nodes may receive the generated haptic signals from the haptic signal generator. In such embodiments, a selector may receive the generated haptic signals from the haptic signal generator and a control signal from the haptic controller indicating the stimulated nodes. The selector may then only open signal lines to the stimulated nodes to send the generated haptic signals.

It is to be understood that the haptic feedback circuit is not limited to that shown in FIG. 8, but may include other components suitable for providing haptic feedback to a surface.

Figure 9A:
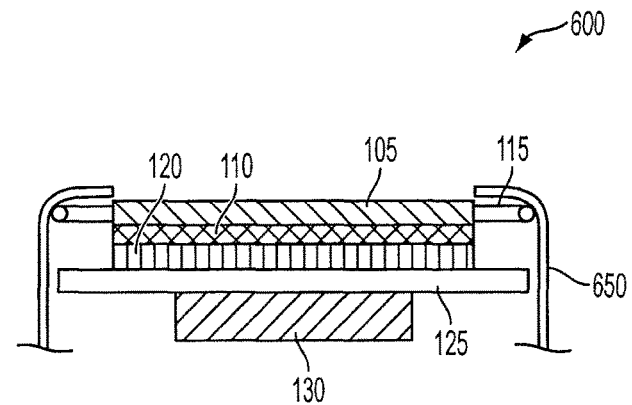
FIG. 9a illustrates a side view of another exemplary touch sensitive device with haptic feedback according to embodiments of the invention.

FIG. 9a illustrates a side view of another exemplary touch sensitive device with haptic feedback according to embodiments of the invention. In the example of FIG. 9a, touch sensitive device 600 may be the same as touch sensitive device 100 of FIG. 4a with the following differences. Here, haptic transmission nodes 115 may be disposed on an interior surface of housing 650 of the touch sensitive device 600 at one end and adjacent to touch surface 105 at the other end. The haptic transmission nodes 115 may be positioned outward around a perimeter of the touch surface 105. The housing 650 may contain the components of the touch sensitive device 600. The electromechanical device (symbolically illustrated by the circles in FIG. 9*a*) may be attached to the interior surface of the housing 650. The movable bar (symbolically illustrated by the horizontal bar attached to the circle in FIG. 9*a*) may be attached to the electromechanical device at one end and free at the other end to be proximate to the touch surface 105. The haptic transmission nodes 115 may have various exemplary states similar to those illustrated in FIGS. 3*a* through 3*f* and 5*a* through 5*g*.

Figure 9B:
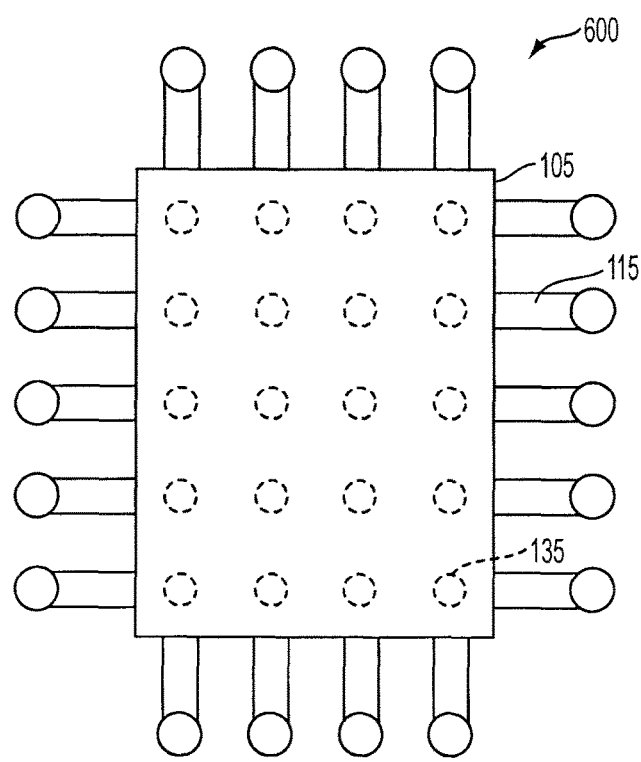
FIG. 9b illustrates a top view of the exemplary touch sensitive device of FIG. 9a according to embodiments of the invention.

FIG. 9*b* illustrates a top view of the exemplary touch sensitive device of FIG. 9*a* according to embodiments of the invention. In the example of FIG. 9*b*, touch sensitive device 600 may be the same as touch sensitive device 100 of FIG. 4*b* with the following differences. Here, haptic transmission nodes 115 may be disposed outward around a perimeter of the touch surface 105 and aligned with the rows and columns of the touch pixels 135.

It is to be understood that the alignment of the haptic transmission nodes around the perimeter of the touch surface is not limited to that illustrated in FIG. 9*b*, but may include other alignments suitable for transmitting haptic feedback to various locations on a touch surface. For example, the haptic transmission nodes may be positioned between rows and columns of the touch pixel array or at alternate rows and columns.

Figure 10A:
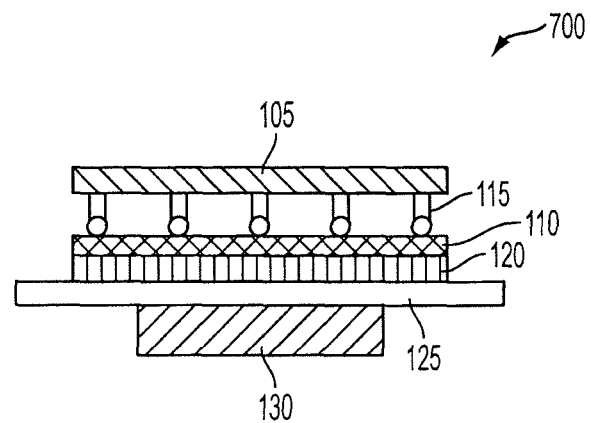
FIG. 10a illustrates a side view of another exemplary touch sensitive device with haptic feedback according to embodiments of the invention.

FIG. 10*a* illustrates a side view of another exemplary touch sensitive device with haptic feedback according to embodiments of the invention. In the example of FIG. 10*a*, touch sensitive device 700 may be the same as touch sensitive device 100 of FIG. 4*a* with the following differences. Here, haptic transmission nodes 115 may be disposed between the touch surface 105 and the touch module 110 to form an array of nodes positioned at approximately the same locations as the touch module's touch pixels. The electromechanical device (symbolically illustrated by the circles in FIG. 10*a*) may be adjacent to the touch pixels. The movable bar (symbolically illustrated by the vertical bar attached to the circle in FIG. 10*a*) may be attached to the electromechanical device at one end and free at the other end to be proximate to the back side of the touch surface 105. The haptic transmission nodes 115 may have a multifunctional role of providing feedback to the touch surface 105 and transmitting touch signals between the touch surface and the touch module 110. The haptic transmission nodes 115 may have various exemplary states similar to those illustrated in FIGS. 3*a* through 3*f* and 5*a* through 5*g*.

Figure 10B:
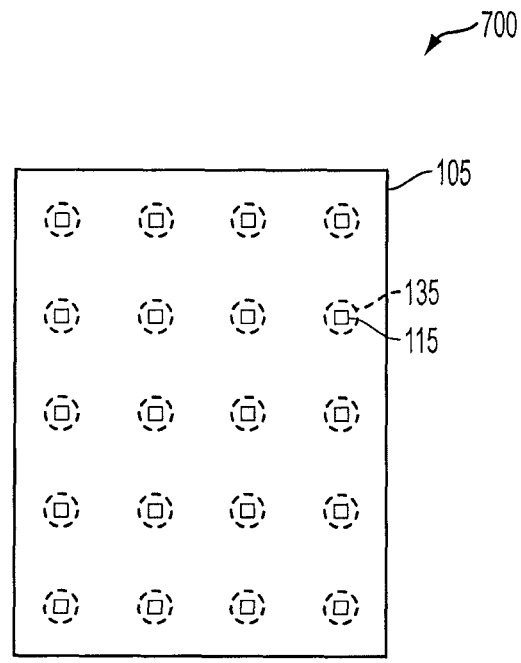
FIG. 10*b* illustrates a top view of the exemplary touch sensitive device of FIG. 10*a* according to embodiments of the invention.

FIG. 10*b* illustrates a top view of the exemplary touch sensitive device of FIG. 10*a* according to embodiments of the invention. In the example of FIG. 10*b*, touch sensitive device 700 may be the same as touch sensitive device 100 of FIG. 4*b* with the following differences. Here, haptic transmission nodes 115 may be disposed on the back side of the touch surface 105 at approximately the same locations as the touch pixels 135. The haptic transmission nodes 115 may be formed in an array of rows and columns at approximately the same locations as the touch pixels 135 form in an array of rows and columns. The nodes 115 may transmit a haptic feedback signal to a location on the touch surface 105 corresponding to the touch pixels 135 that detect a touch. Each node 115 may correspond to a touch pixel 135. Therefore, when a touch is detected at a particular touch pixel 135, the node 115 at that touch pixel's location may transmit a haptic feedback signal to the touch location on the touch surface 105.

It is to be understood that the alignment of the haptic transmission nodes with the touch pixels is not limited to that illustrated in FIG. 10*b*, but may include other alignments suitable for transmitting haptic feedback to various locations on a touch surface. For example, the haptic transmission nodes may be positioned between the touch pixel locations or at alternate pixel locations.

Figure 11:
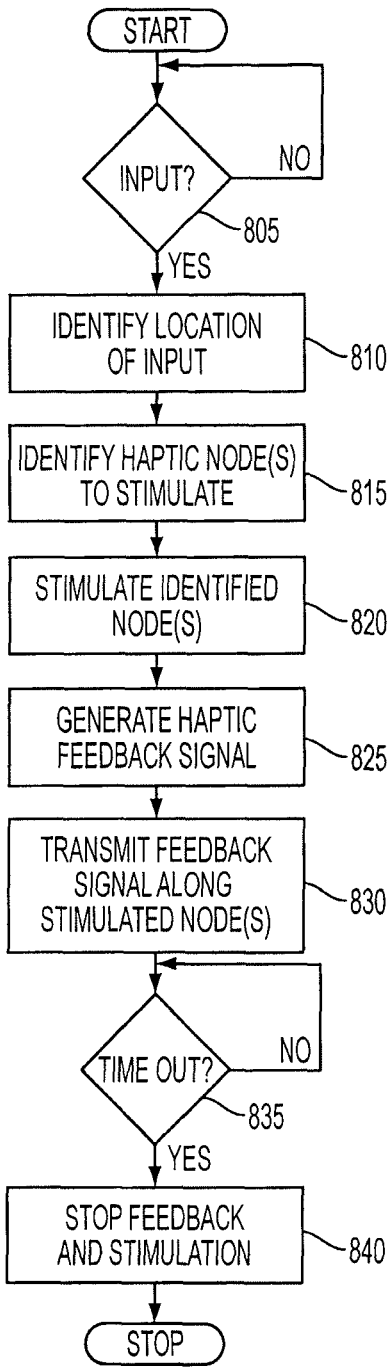
FIG. 11 illustrates an exemplary method for providing haptic feedback to an input surface according to embodiments of the invention.

FIG. 11 illustrates an exemplary method for providing haptic feedback to an input surface according to embodiments of the invention. In the example of FIG. 11, a determination can be made about whether an input has been received on an input surface (805). If an input has been received, the location of the input on the input surface may be identified (810). The haptic transmission nodes corresponding to the location of the input may be identified (815). For example, the haptic transmission nodes on the perimeter of the input surface that are aligned with the row and column of the input location may be identified. Alternatively, the haptic transmission nodes located on a back side of the input surface at the input location may be identified. In some embodiments, the haptic transmission nodes may be identified without there having been an input on the input surface. For example, the haptic transmission nodes may be identified prior to the input so that the haptic feedback signal will already be present when the input is received.

The identified haptic transmission nodes can be stimulated (820) in order to place in transmission or non transmission state. For example, electromechanical devices may be powered up to apply an electrical current to movable bars to bring the bars into rigid contact with the input surface. Alternatively, electromechanical devices may be actuated to rotate the movable bars to bring the bars into rigid contact with the input surface. Alternatively, dynamic shape-memory material may become rigid and made to contact the input surface. If there are currently stimulated nodes that have not been identified, i.e., that do not correspond with the input location, these nodes may be unstimulated. For example, their electromechanical devices may be powered down to terminate or reduce an electrical current to movable bars to make the bars loose and out of contact with the input surface. Alternatively, their electromechanical devices may be actuated to rotate the movable bars out of contact with the input surface. Alternatively, their dynamic shape-memory material may be made loose and move away from the input surface.

A haptic feedback signal may be generated (825). For example, a vibration wave may be generated by a vibration motor. Alternatively, a pulse signal may be generated by a pulse generator. In some embodiments, multiple haptic feedback signals may be generated using multiple generators and applied to different sets of haptic transmission nodes. For example, a first vibration wave may be generated by a first vibration motor for one set of haptic transmission nodes, e.g., the nodes aligned with rows of touch pixels. A second vibration wave may be generated by a second vibration motor for another set of haptic transmission nodes, e.g., the nodes aligned with columns of touch pixels. The different vibrations could be combined to provide suitable haptic feedback. To combine, the first and second vibration waves may have the same or compatible phases and/or frequencies to be additive and avoid canceling each other out. In some embodiments, the haptic transmission nodes may be spaced sufficiently apart, e.g., at quarter- or half-wavelengths, to ensure that the signals have compatible frequencies at the input location. In some embodiments, the haptic transmission nodes may have phase delays, e.g., 45° or 90°, which may be selectively applied to ensure that the signals have compatible phases at the input location. Other suitable approaches may be used to ensure that the signals are combined at the input location.

The generated haptic feedback signal can be transmitted by the stimulated haptic transmission nodes to the identified input location on the input surface, thereby providing haptic feedback (830). The generated haptic feedback signal may be received by all the nodes and only transmitted by the stimulated nodes. The unstimulated nodes may attenuate or otherwise prevent transmission. Alternatively, the generated haptic feedback signal may only be received by the stimulated nodes and then transmitted therefrom.

The generated haptic feedback signal may be transmitted to the input surface for a predetermined time period. A determination can be made whether the predetermined time period has timed out (835). If so, the transmission may stop and the stimulated nodes may be unstimulated as described above (840).

When there is no received input on the input surface, the haptic transmission nodes may go to a default state. Some nodes may be made rigid in order to stabilize the input surface, while others may be loose. Alternatively, all the nodes may be made rigid.

Figure 12A:
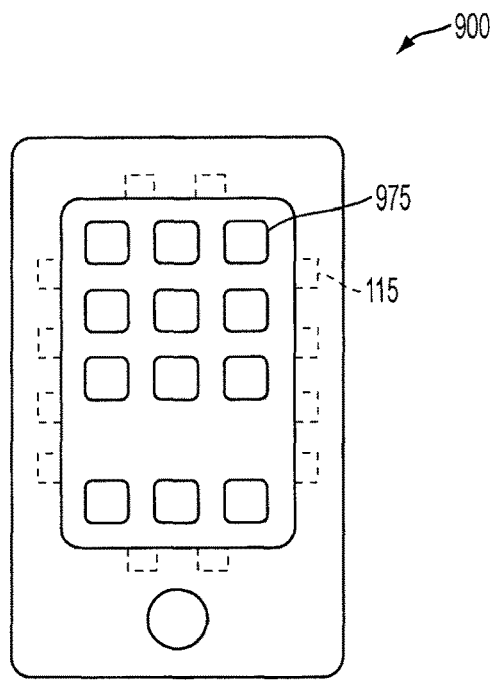
FIGS. 12*a* and 12*b* illustrate an exemplary electronic device with haptic feedback according to embodiments of the invention.
Figure 12B:
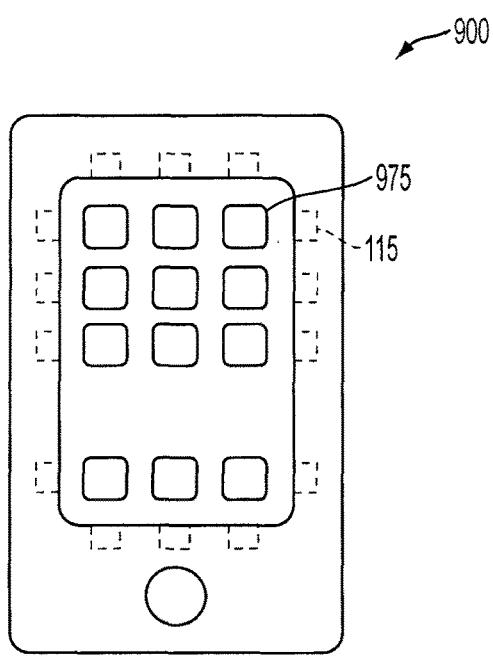

FIGS. 12*a* and 12*b* illustrate an exemplary electronic device with haptic feedback according to embodiments of the invention. In the example of FIG. 12*a*, electronic device 900 can display graphical user interface (GUI) buttons 975 that a user can select by touching the display surface at the displayed buttons' locations. In some embodiments, the electronic device 900 can have controllable haptic transmission nodes 115 proximate to the display surface and aligned with the spaces between the buttons 975. The nodes 115 can be controlled to together transmit a haptic feedback signal to the display surface, resulting in haptic feedback on all four sides of the buttons 975 to provide a tactile boundary for each button. As such, a user can know the location of the buttons 975. In the example of FIG. 12*b*, the electronic device 900 can have controllable haptic transmission nodes 115 proximate to the display surface and aligned with the buttons 975 themselves. The nodes 115 aligned with a particular button 975 can be controlled to transmit a haptic feedback signal to the display surface when the button is pressed. As such, a user can know that the button 975 has been pressed. A combination of the embodiments shown in FIGS. 12*a* and 12*b* may also be used.

The exemplary electronic device may be widely varied. In some embodiments, the electronic device is a handheld electronic device such as a phone, media player, PDA, miniature computer, internet/email device and/or the like. In one example, the electronic device includes a front face for providing inputs/outputs. In one example, the front face includes an upper display and a lower input device such as touch pad or navigation pad. In this example, the lower input device may include a haptic system. In another example, the front face may include a touch screen that combines a display and a touch sensing mechanism into a single unit. The touch screen may for example substantially fill the front face. Examples of handheld electronic device may be iPod and iPhone products produced by Apple, Inc of Cupertino, Calif.

Figure 13:
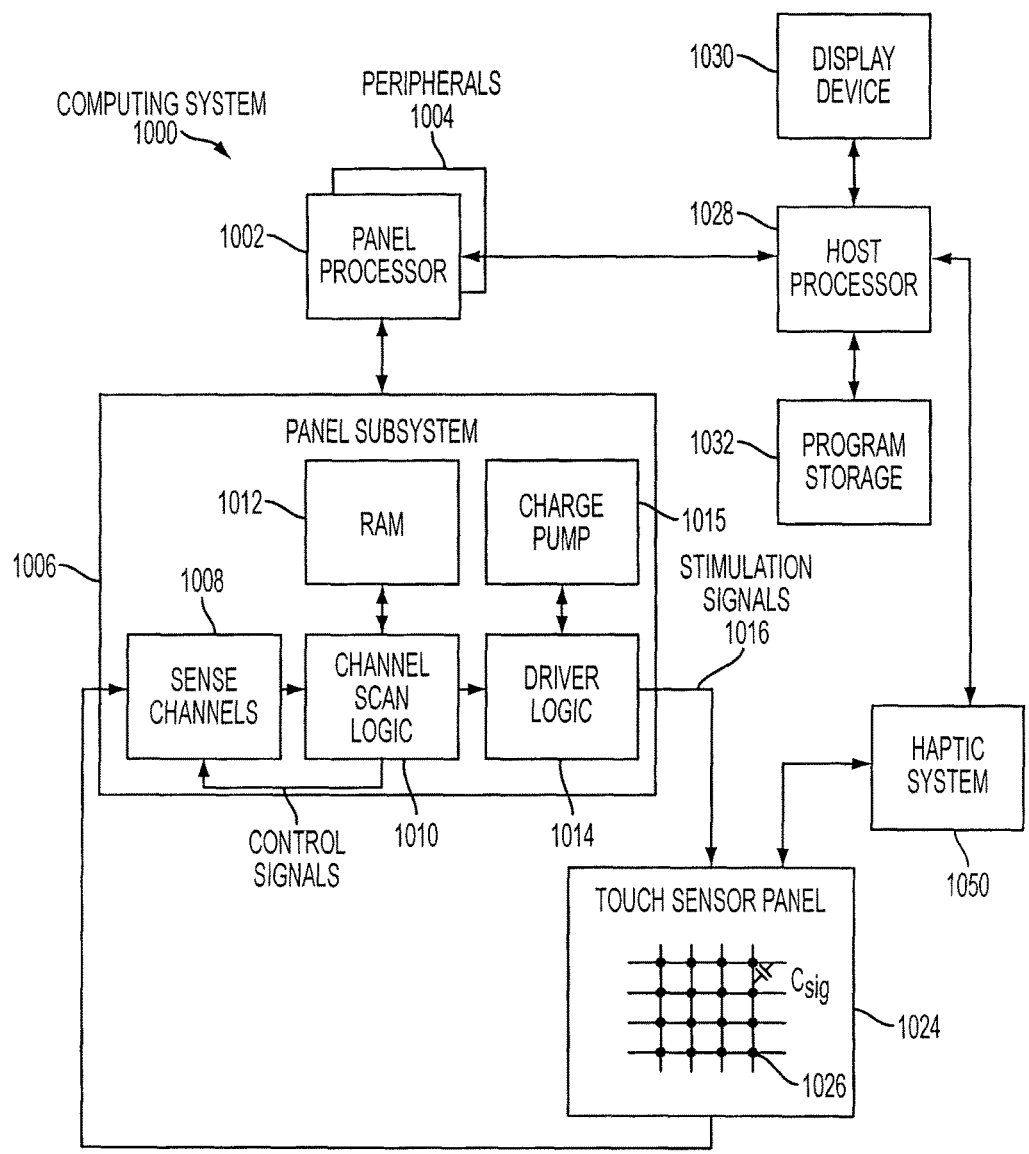
FIG. 13 illustrates an exemplary computing system with haptic feedback according to embodiments of the invention.

FIG. 13 illustrates an exemplary computing system that can include one or more of the embodiments of the invention described herein. In the example of FIG. 13, computing system 1000 can include one or more panel processors 1002 and peripherals 1004, and panel subsystem 1006. Peripherals 1004 can include, but are not limited to, random access memory (RAM) or other types of memory or storage, watchdog timers and the like. Panel subsystem 1006 can include, but is not limited to, one or more sense channels 1008, channel scan logic (analog or digital) 1010 and driver logic (analog or digital) 1014. Channel scan logic 1010 can access RAM 1012, autonomously read data from sense channels 1008 and provide control for the sense channels. In addition, channel scan logic 1010 can control driver logic 1014 to generate stimulation signals 1016 at various phases that can be simultaneously applied to drive lines of touch sensor panel 1024 according to embodiments of the invention. Panel subsystem 1006 can operate at a low digital logic voltage level (e.g. 1.7 to 3.3V). Driver logic 1014 can generate a supply voltage greater that the digital logic level supply voltages by cascading two charge storage devices, e.g., capacitors, together to form charge pump 1015. Charge pump 1015 can be used to generate stimulation signals 1016 that can have amplitudes of about twice the digital logic level supply voltages (e.g. 3.4 to 6.6V). Although FIG. 13 shows charge pump 1015 separate from driver logic 1014, the charge pump can be part of the driver logic. In some embodiments, panel subsystem 1006, panel processor 1002 and peripherals 1004 can be integrated into a single application specific integrated circuit (ASIC).

Touch sensor panel 1024 can include a capacitive sensing medium having a plurality of drive lines and a plurality of sense lines, although other sensing media can also be used. The drive and sense lines can be formed from a transparent conductive medium such as Indium Tin Oxide (ITO) or Antimony Tin Oxide (ATO), although other transparent and non-transparent materials such as copper can also be used. The drive and sense lines can be formed on a single side of a substantially transparent substrate, on opposite sides of the substrate, or on two separate substrates separated by the dielectric material. Each intersection of drive and sense lines can represent a capacitive sensing node and can be viewed as picture element (pixel) 1026, which can be particularly useful when touch sensor panel 1024 is viewed as capturing an "image" of touch. (In other words, after panel subsystem 1006 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Haptic feedback can be transmitted to the location of the "image" of touch according to embodiments of the invention. The capacitance between the drive and sense lines and local system ground appears as a stray capacitance Cstray and the capacitance at the intersections of the drive and sense lines, i.e., the pixels, as a mutual signal capacitance Csig when the given drive line is stimulated with an alternating current (AC) signal. The presence of a finger or other object near or on the touch sensor panel can be detected by measuring changes to a signal charge present at the pixels being touched, which is a function of Csig. Each sense line of touch sensor panel 1024 can drive sense channel 1008 in panel subsystem 1006.

Haptic system 1050 can include controllable nodes and associated haptic feedback circuitry as described previously to provide haptic feed back to a surface of touch sensor panel 1024 according to embodiments of the invention.

Computing system 1000 can also include host processor 1028 for receiving outputs from panel processor 1002 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1028 can also perform additional functions that may not be related to panel processing, and can be coupled to program storage 1032, haptic system 1050, and display device 1030 such as an LCD display for providing a UI to a user of the device. Display device 1030 together with touch sensor panel 1024, when located partially or entirely under the touch sensor panel, can form a touch screen. Haptic system 1050 together with touch sensor panel 1024, when proximate to the touch sensor panel, can provide haptic feedback to the surface of the touch sensor panel.

Note that one or more of the functions described above can be performed by firmware stored in memory (e.g. one of the peripherals 1004 in FIG. 13) and executed by panel processor 1002, or stored in program storage 1032 and executed by host processor 1028. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the sensor panel is not limited to a touch sensor panel, as described in FIG. 13, but may be a proximity sensor panel or any other sensor panel capable of sensing a touch or hover event and providing haptic feedback thereto according to embodiments of the invention. Furthermore, although the touch sensors in the touch sensor panel may be described herein in terms of an orthogonal array of touch sensors having rows and columns, it should be understood that embodiments of this invention are not limited to orthogonal arrays, but can be generally applicable to touch sensors arranged in any number of dimensions and orientations, including diagonal, concentric circle, and three-dimensional and random orientations. In addition, the touch sensor panel described herein can be either a single-touch or a multi-touch sensor panel.

Although some embodiments of this invention may be described herein in terms of touch sensitive devices with haptic feedback, it should be understood that embodiments of this invention are not so limited, but are generally applicable to input devices utilizing some type of sensing technology with haptic feedback. For example, an alternate input device may be a navigation device utilizing a moving action with haptic feedback.

Figure 14A:
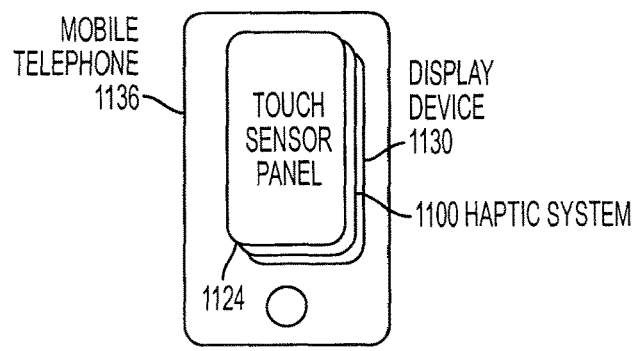
FIG. 14*a* illustrates an exemplary mobile telephone with haptic feedback according to embodiments of the invention.

FIG. 14a illustrates an exemplary mobile telephone 1136 that can include touch sensor panel 1124, haptic system 1100, display device 1130, and other computing system blocks that can be utilized for providing haptic feedback.

Figure 14B:
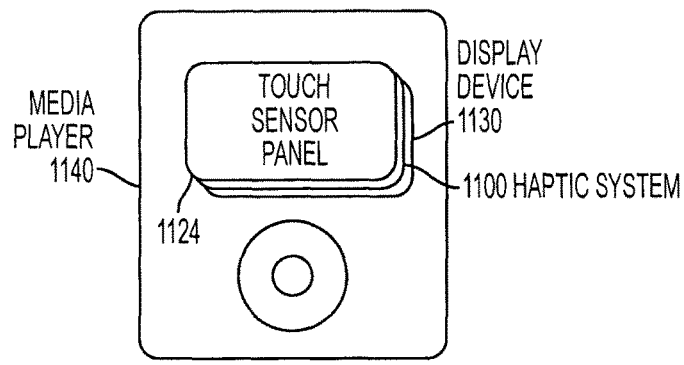
FIG. 14*b* illustrates an exemplary digital media player with haptic feedback according to embodiments of the invention.

FIG. 14b illustrates an exemplary digital media player 1140 that can include touch sensor panel 1124, haptic system 1100, display device 1130, and other computing system blocks that can be utilized for providing haptic feedback.

Figure 14C:
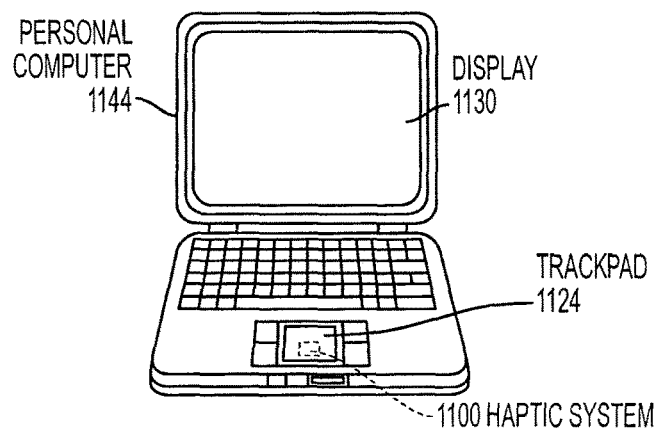
FIG. 14*c* illustrates an exemplary computer with haptic feedback according to embodiments of the invention.

FIG. 14c illustrates an exemplary personal computer 1144 that can include touch sensor panel (trackpad) 1124, haptic system 1100, display 1130, and other computing system blocks that can be utilized for providing haptic feedback.

The mobile telephone, media player, and personal computer of FIGS. 14a, 14b and 14c can improve the user experience by providing haptic feedback according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A haptic feedback device comprising:
 a plurality of controllable nodes disposed between a first surface and a second surface, the controllable nodes being configurable to change between transmission states and non-transmission states so as to pass or block a haptic signal received from the second surface and provide a localized haptic response at the first surface when two or more of the controllable nodes are configured to pass the received haptic signal, the plurality of controllable nodes being individually configurable to combine the haptic signal at one or more of a plurality of selectable regions to provide the localized haptic response.

2. The haptic feedback device of claim 1, further comprising a haptic signal generator configured to produce the haptic signal, the haptic signal generator being operatively coupled to the plurality of controllable nodes through the second surface.

3. The haptic feedback device of claim 1, wherein the plurality of controllable nodes are placed proximate an edge of the first surface.

4. The haptic feedback device of claim 1, wherein the plurality of controllable nodes are disposed around a perimeter of the first surface.

5. The haptic feedback device of claim 4, wherein some of the plurality of controllable nodes are disposed on a first edge of the first surface and some of the plurality of controllable nodes are placed on a second edge of the first surface, and wherein at least some of the plurality of controllable nodes on opposing edges are aligned with one another, each of the aligned opposing controllable nodes forming a haptic path for the haptic signal at the first surface.

6. The haptic feedback device of claim 5, wherein a first set of the plurality of controllable nodes are aligned in a first direction, and a second set of the plurality of controllable nodes are aligned in a second direction, the first and second directions being transverse to one another such that they intersect, an intersection of the haptic paths creating a haptic output region where the haptic signal can be felt by a user.

7. The haptic feedback device of claim 1, wherein the plurality of controllable nodes are configured to dampen the haptic signal to the first surface thereby creating the transmission and non-transmission states.

8. The haptic feedback device of claim 1, wherein the plurality of controllable nodes are configured to couple or decouple the haptic signal to the first surface thereby creating the transmission and non-transmission states.

9. The haptic feedback device of claim 1, further comprising a haptic controller that receives a signal indicating a location of an object near or at the first surface, and that selectively controls the controllable nodes to produce the localized haptic response at the location of the object relative to the first surface.

10. The haptic feedback device of claim 1 wherein the first surface is configured as a touch sensor panel.

11. The haptic feedback device of claim 1, wherein each node comprises:
 a movable bar; and
 an electromechanical device attached to one end of the movable bar and configured to rotate the movable bar, the electromechanical device having a plurality of states, wherein the transmission state is a rigid state at which the other end of the movable bar is in direct contact with the surface and the non-transmission state is a loose state at which the other end of the movable bar is away from the surface.

12. The haptic feedback device of claim 1, wherein each node comprises:
 a flexible bar having a plurality of states, the transmission state being rigid in which the flexible bar is in contact with the surface and the non-transmission state being loose in which the flexible bar is away from the surface; and
 an electromechanical device attached to the flexible bar and configured to trigger a particular state in the flexible bar.

13. The haptic feedback device of claim 1, wherein each node comprises:
 a dynamic material having a plurality of states, wherein, in the transmission state, the material is rigid and, in the non-transmission state, the material is loose.

14. The haptic feedback device of claim 1, further comprising a waveguide configured to transmit the haptic signal from the nodes in the transmission state to specific regions of the first surface.

15. A touch sensitive device with a haptic system, comprising:
 a surface;
 a sensor arrangement configured to detect a location of an object in close proximity to the surface;
 a haptic signal generator configured to produce a haptic signal when an object is detected; and
 a plurality of haptic transmission nodes coupled between the surface and the haptic signal generator and positioned at different locations relative to the surface, the haptic transmission nodes being configurable to receive the haptic signal from the haptic signal generator, and to change states in order to selectively pass or block transmission of the received haptic signal and provide a localized haptic response at the surface when two or more of the plurality of haptic transmission nodes are configured to pass the received haptic signal, the plurality of haptic transmission nodes being individually configurable to combine the haptic signal at one or more of a plurality of selectable regions to provide the localized haptic response.

16. The device of claim 15, wherein the plurality of haptic transmission nodes are positioned at different locations around a perimeter of the surface.

17. The device of claim 16, wherein haptic transmission nodes disposed on opposite edges of the surface are aligned with one another.

18. The device of claim 15, wherein the sensor arrangement is a touch sensor arrangement having a plurality of touch pixels disposed across the surface.

19. The device of claim 18 further comprising a controller in communication with the plurality of touch pixels and the plurality of haptic transmission nodes, wherein the controller is configured to identify two or more of the plurality of haptic transmission nodes corresponding to the at least one touch pixel that detects the touch and to cause the identified two or more haptic transmission nodes to transmit the haptic signal to the location of the detected touch on the device.

20. The device of claim 15, wherein the haptic signal includes first and second vibration waves, the device further comprising a first vibration motor configured to generate the first vibration wave to transmit to some of the nodes and a second vibration motor configured to generate the second vibration wave to transmit to the rest of the nodes.

21. The device of claim 15, wherein the touch sensitive device with haptic system is incorporated in an electronic device selected from a mobile telephone, a digital media player or a computer.

22. A method for providing a haptic feedback signal to a surface, comprising:
 identifying two or more haptic transmission nodes from a plurality of individually configurable haptic transmission nodes, the two or more haptic transmission nodes corresponding to one or more of a plurality of selectable locations on the surface;
 placing the identified two or more haptic transmission nodes into a transmission state;
 generating a haptic feedback signal outside the identified two or more haptic transmission nodes and applying the haptic feedback signal to the identified two or more haptic transmission nodes; and
 transmitting the generated haptic feedback signal via the identified two or more haptic transmission nodes and combining the haptic signal at the one or more selectable locations on the surface to provide a localized haptic response.

23. The method of claim 22, further comprising determining whether the generated haptic feedback signal has been transmitted for a predetermined time.

24. The method of claim 23, further comprising, if the generated haptic feedback signal has been transmitted for the predetermined time, stopping transmission of the generated haptic feedback signal.

25. The method of claim 22, further comprising:
selectively transmitting the haptic feedback signal via the two or more haptic transmission nodes to the input surface.

26. The method of claim 25, wherein selectively transmitting includes placing a first set of the haptic transmission nodes in a non-transmission state while placing a second set of the haptic transmission nodes in a transmission state, the haptic transmission nodes in the transmission state corresponding to the one or more locations.

* * * * *

UNITED STATES PATENT AND TRADEMARK OFFICE
CERTIFICATE OF CORRECTION

PATENT NO. : 10,289,199 B2
APPLICATION NO. : 12/240947
DATED : May 14, 2019
INVENTOR(S) : Quin C. Hoellwarth Page 1 of 1

It is certified that error appears in the above-identified patent and that said Letters Patent is hereby corrected as shown below:

In the Claims

In Column 22, Line 23, in Claim 19, delete "claim 18" and insert -- claim 18, --.

Signed and Sealed this
Thirty-first Day of March, 2020

Andrei Iancu
*Director of the United States Patent and Trademark Office*